United States Patent Office 3,769,266
Patented Oct. 30, 1973

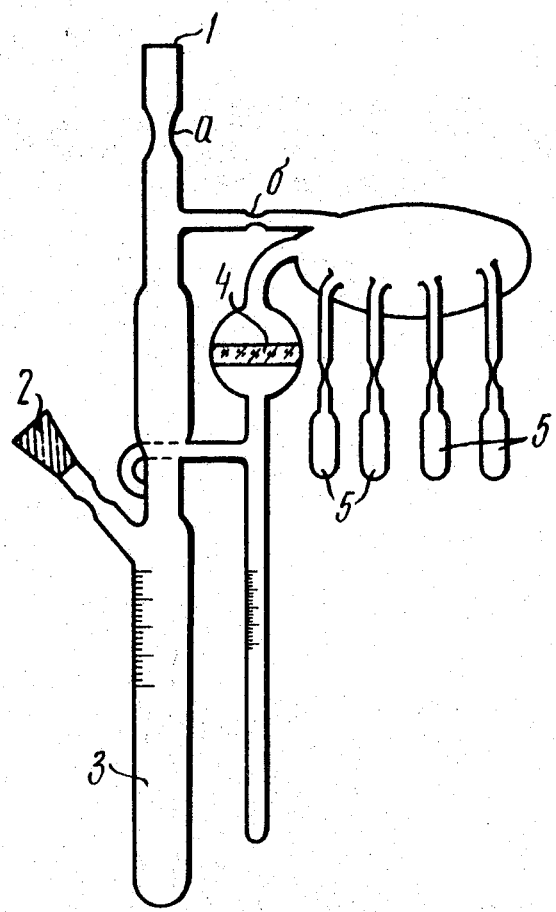

3,769,266
PROCESS FOR POLYMERIZING UNSATURATED MONOMERS WITH DILITHIUM ORGANOSILANE OLIGOMERS
Nikolai Sergeevich Nametkin, Leninsky prospekt 13, kv. 11; Serge Garievich Durgarian, ulitsa Garibaldi 21, korpus 3, kv. 67; Vadim Ivanovich Kopkov, ulitsa Zelenogradskaya 25, korpus 2, kv. 194; Valery Samuilovich Khotimsky, Konkovo-Derevlevo, 1 miqroraion, korpus 7, kv. 147; and Irina Sergeevna Bryantseva, Leninsky prospekt 69, kv. 83, all of Moscow, U.S.S.R.; and Gennady Nikolaevich Petrov, Zheleznodorozhny pereulok 7, kv. 35; Gennady Mikhailovich Tolstopyatov, Bulvar Novatorov 88, kv. 146; Tatyana Vladimirovna Stadnichuk, prospekt Kosmonavtov 48, kv. 110; Tatyana Alexeevna Kornilova, Tallinskoe shosse 48, kv. 55; and Anna Berkovna Shoikhet, Varshavskaya ulitsa 69, kv. 111, all of Leningrad, U.S.S.R.
Filed Aug. 13, 1970, Ser. No. 63,517
Claims priority, application U.S.S.R., Aug. 13, 1969, 1358104
Int. Cl. C08f 1/28, 7/04
U.S. Cl. 260—80 PS
10 Claims

ABSTRACT OF THE DISCLOSURE

Diene and vinyl monomer polymerization catalysts consisting of dilithium organosilane oligomers represented by

wherein R denotes the same or different $C_1$–$C_{10}$ alkyl radicals, or alkl radicals or aryl radicals, and $n$ is an integer from 2 to 30.

The claimed catalysts are useful for polymerizing diene and vinyl monomers in hydrocarbon media under homogeneous conditions.

The process may find application in the synthetic rubber industry.

---

This invention relates to the synthesis of high molecular weight compounds by polymerization and, more particularly, is concerned with organodilithium polymerization catalysts and with a method of using the same for the polymerization of diene and vinyl monomers.

The employment of the catalysts of the present invention makes it possible to effect controlled polymerization of isoprene, butadiene, styrene, vinyltriorganosilanes, etc. and also to obtain statistical and block copolymers therefrom.

It is known to use in polymerizations and copolymerizations of the aforesaid monomers lithium-containing catalysts such as, for example, lithium alkyls and other organolithium compounds.

When use is made of monolithium compounds as catalysts, polymer chain growth occurs only at one end of the polymer chain, so that in many instances the desired rate of producing the polymers having the requisite molecular weight cannot be attained.

To overcome this disadvantage, it was suggested to employ dilithium catalysts which provide for polymer chain growth simultaneously at both chain ends, thereby making it possible, the concentration of lithium being the same, to obtain the polymers of a higher molecular weight than those prepared through the use of monolithium catalysts, or else to reduce by one half the time required for preparation of a polymer of a given molecular weight. A further advantage of dilithium catalysts is associated with lower susceptibility of the number of growing chains to the presence of impurities capable of poisoning organolithium compounds, since with an active center inhibited at one end of the chain, chain growth at the other end remains unaffected.

The known organodilithium catalysts such as, for example, dilithium naphthalene, dilithium stilbene, etc., are insoluble in hydrocarbon media (in bulk hydrocarbon monomers and hydrocarbon solvents), which are preferably used for carrying sterospecific polymerizations and copolymerizations. Hence, polymerizations in the presence of the known organodilithium catalysts are necessarily heterogeneous processes and as such cannot be accomplished in a facile and convenient manner and, moreover, affect adversely the quality characteristics of end products.

It is an object of the present invention to provide a polymerization process which can be carried out under homogeneous conditions in a hydrocarbon medium and in the presence of dilithium catalysts.

It is another object of the present invention to provide organodilithium compounds soluble in a hydrocarbon medium and capable of catalyzing the process of diene and vinyl monomer polymerization.

We have found that these objects are accomplished by the provision of hydrocarbon-soluble organodilithium catalysts comprised of the heretofore unknown dilithium organosilane oligomers having the general formula

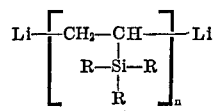

where R denotes the same or different alkyl radicals which may contain from 1 to 10 carbon atoms, aryl or aralkyl radicals, and $n$ is an integer of from 2 to 30, preferably from 2 to 10.

The radicals R are selected from the group consisting of methyl, ethyl, propyl, isopropyl, butyl, isobutyl, amyl, isoamyl, hexyl, isohexyl, etc., benzyl, phenylethyl, phenylpropyl, etc. and phenyl, naphthyl, tolyl, etc.

The catalysts, according to the present invention, include, for example, dilithium oligovinyltrimethylsilane

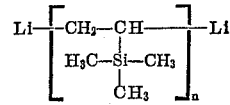

dilithium oligovinylbenzyldimethylsilane

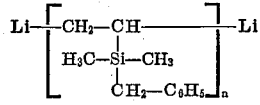

and diluthium oligovinylphenyldimethylsilane

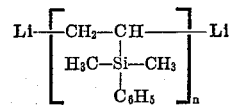

In the aforesaid oligomers $n$ is an integer of from 2 to 30.

The compounds specified herein before are oligomers which are readily soluble in organic solvents such as, for example, benzene, toluene, pentane, hexane, heptane, octane, decane, cyclohexane and other aromatic, aliphatic or cycloaliphatic hydrocarbons or mixtures thereof, ethers such as, for example, diethyl ether and dibutyl ether, and tertiary amines such as, for example, triethylamine.

Said oligomers are prepared by reacting vinyltriorganosilanes of the general formula

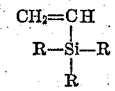

wherein R denotes the same or different alkyl radicals having from 1 to 10 carbon atoms, aryl or substituted aralkyl radicals, with lithium metal at a temperature of from 0° to 100° C., preferably from 25° to 60°, in an atmosphere that is chemically inert towards organolithium compounds, e.g. under argon, helium, etc., or in vacuo at a residual pressure of down to $10^{-5}$ mm. Hg.

Lithium may be used in the form of a suspension, small pieces, or a mirror on the reaction vessel walls.

The vinyltriorganosilane-to-lithium ratio (mole/gram-atom) should be in the range of 1:3 to 10:1, preferably from 1:2 to 2:1.

The present invention also consists in a method of polymerizing diene and vinyl monomers which comprises subjecting diene or vinyl monomers to polymerization in the presence of dilithium organosilane oligomers of the general formula given herein before.

The present method of polymerizing diene and vinyl monomers under the effect of the catalysts, according to the invention, may be practiced in different ways. For example, the process may be carried out in the monomer bulk or in organic solvent media, hydrocarbon solvents inclusive, such as pentane, hexane, heptane, nonane, decane, cyclohexane, benzene, toluene, etc., or in mixtures of said solvents.

Depending upon the monomer used, the process temperature may be varied from —50° to +150° C.

Insofar as the process of polymerization in the presence of organolithium compounds is susceptible to diverse impurities such as, for example oxygen, water, alcohols, etc., use is made of dry, high purity monomers.

Polymerization can be conducted in vacuo under a residual pressure down to $10^{-5}$ mm. Hg or in an atmosphere that is chemically inert towards organolithium compounds, e.g. under methane, argon, helium, and the like.

The catalyst-to-monomer molar ratio lends itself to variations within a wide range depending upon the sought-for molecular weight of the polymerization product. With the catalyst-to-monomer molar ratio varying from 1:15 to 1:10,000, it is practicable to obtain both low and high molecular weight products.

When the reaction mixture contains a high proportion of the catalysts, the reaction yields oligomers which may find application in diverse syntheses such as, for example, preparation of dicarboxylic acids, diols, diamines, etc. High molecular weight products are obtained in case the catalyst-to-monomer molar ratio in the reaction mixture is low, e.g. from 1:500 to 1:10,000.

The employments of oligomers of the present invention as catalysts makes it possible to effect the polymerization of a broad range of diene and vinyl monomers such as, for example, butadiene, isoprene, styrene, substituted styrenes, methyl methacrylate, vinyltrimethylsilane, vinylphenyldimethylsilane, vinylethyldimethylsilane, vinylbutyldimethylsilane, and the like.

The employment of hydrocarbon-soluble dilithium derivatives of organosilane oligomers as catalysts in diene and vinyl monomer polymerizations makes for a substantial facilitation of polymerization process control, for example, by dosaging accurately the catalyst solution in order to provide appropriate conditions for the preparation of polymers having the desired molecular weights.

Catalyst solubility in the reaction medium is conducive to carrying out homogeneous polymerizations which offer advantages as far as the manufacturing equipment and process simplicity are concerned.

The catalysts of the present invention are useful for conducting the stereospecific polymerization of conjugated diene monomers and vinyl monomers in a reaction medium consisting of hydrocarbon solvents such as, for example, hexane, heptane, benzene, toluene, and cyclohexane.

For a better understanding of how the present invention may be practiced, the following examples are given by way of illustration with reference to the accompanying drawing which shows the apparatus for synthesizing and metering out the catalysts.

EXAMPLE 1

Synthesis of dilithium oligovinyltrimethylsilane

The reaction is carried out in the glass apparatus shown in the drawing. The apparatus via outlet tube 1 is sealed to a vacuum unit capable of producing a vacuum of $1 \times 10^{-3}$ mm. Hg and evacuated for a period of 48 hours, followed by disconnecting the apparatus from the vacuum unit and filling it with dry and pure argon. Next 0.5 g. (0.06 gram-atom) of lithium dispersed in paraffin is introduced in a stream of argon via inlet tube 3 into ampoule 3. Inlet tube 2 is next sealed off, and the apparatus is connected to the vacuum unit in order to condense via outlet 1 into ampoule 3 vinyltrimethylsilane (17.7 g.; 0.177 mole) and cyclohexane (100 ml.). The apparatus is sealed off the vacuum unit at points $a$ and $b$ and placed in a thermostat.

The reaction is carried out for a period of 24 hours at 25° C. The resultant solution is filtered through a sintered glass funnel (G–5.4) and placed in ampoules 5.

In the resultant solution of the organodilithium compound, the concentration of lithium equals 0.49 gram-atom per liter.

The oligomer thus prepared has a molecular weight of 960 (according to cryoscopic measurements), the degree of polymerization being $n \cong 9$.

EXAMPLE 2

Synthesis of dilithium oligovinylbenzyldimethylsilane

Employing the apparatus and the procedure described in Example 1, dilithium oligovinylbenzyldimethylsilane is prepared from 7.1 g. (0.04 mole) of vinylbenzyldimethylsilane and 1 g. (0.14 gram-atom) of lithium in 40 ml. of decane. The reaction is carried out for 24 hours at 80° C.

In the resultant solution of the organodilithium compound, the concentration of lithium equals 1 gram-atom per liter.

The molecular weight of the dilithium oligovinylbenzyldimethylsilane determined cryoscopically equals 350 ($n \cong 2$).

EXAMPLE 3

Synthesis of dilithium oligovinylphenyldimethylsilane

Employing the apparatus and the procedure described in Example 1, dilithium oligovinylphenyldimethylsilane is prepared from 8 g. (0.05 mole) of vinylphenyldimethylsilane and 1.1 g. (0.15 gram-atom) of lithium in 50 ml. of benzene. The reaction is carried out for 18 hours at 0° C.

In the resultant solution of the organodilithium compound, the concentration of lithium equals 0.6 gram-atom per liter.

The molecular weight of the dilithium oligovinylphenyldimethylsilane thus prepared equals 4,500, so that the degree of polymerization, $n$, is ca. 30.

EXAMPLE 4

Synthesis of dilithium oligovinylamyldimethylsilane

Employing the apparatus and the procedure described in Example 1, dilithium oligovinylamyldimethylsilane is prepared from 13.7 g. (0.1 mole) of vinylamyldimethylsilane and 0.07 g. (0.01 gram-atom) of lithium in 50 ml. of hexane. The reaction is carried out for 48 hours at 40° C.

In the resultant solution of the organodilithium compound the concentration of lithium equals 1 gram-atom per liter.

The molecular weight of the oligomer measured by the cryoscopic method equals 580 (degree of polymerization ca. 3–4).

EXAMPLE 5

Polymerization of divinyl (a) In a 1-l. reactor fitted with a stirrer and filled with argon are charged in a stream of dry, pure argon 130 ml. of divinyl, 500 ml. of toluene, and 10 ml. of a toluene solution of dilithium oligovinyltrimethylsilane (lithium concentration in the solution, 0.05 gram-atom per liter). The polymerization is conducted for a period of 4 hours at a temperature of 60° C., the yield of polydivinyl being 82%.

Intrinsic viscosity (in benzene) equals 3.2 dl./g.

Polymerizations of isoprene, 2-methylpentadiene-1,3,2, 3-dimethylbutadiene and cyclopentadiene are carried out by following the above procedure.

(b) In a 1-l. reactor fitted with a stirrer and filled with argon are charged 200 ml. of divinyl, 500 ml. of cyclohexane, and 15 ml. of the dilithium oligovinylbenzyldimethylsilane solution prepared in accordance with the procedure of Example 3. The reaction mixture is maintained in the reactor for 4 hours at 55–60° C., followed by cooling the reaction mixture down to 20° C., introducing 3.0 g. of propylene oxide into the reactor, and continuing the reaction for an additional 2 hours at a temperature of 20° C.

In the polymer separated by treating the reaction mixture with water, the content of hydroxyl groups equals 1.30% by weight. The molecular weight of the polymer determined by the cryoscopic method equals 3,500.

EXAMPLE 6

Polymerization of vinyltrimethylsilane

A sealed ampoule containing 2 ml. of a dilithium vinyltrimethylsilane solution (lithium concentration in the solution, 0.5 gram-atom per liter) is placed in a 1-l. ampoule fitted with a metallic ampoule breaker. The larger ampoule is connected to a vacuum unit, evacuated for 24 hours in order to remove the traces of moisture from the inner walls, and thereafter charged with 500 g. (5 moles) of dry and pure vinyltrimethylsilane by recondensation in vacuo.

The ampoule is sealed off and, after breaking the catalyst-containing ampoule, placed in a thermostat, in which it is maintained at 40° C. for a period of 200 hours.

The yield of polyvinyltrimethylsilane equals 76%.

Intrinsic viscosity (in cyclohexane at 25° C.), 1.8 dl./g.

EXAMPLE 7

Polymerization of vinylphenyldimethylsilane

Polymerization is carried out by following the procedure described in Example 6.

320 g. (2 moles) of vinylphenyldimethylsilane and 2 ml. of a benzene solution of dilithium oligovinylphenyldimethylsilane (lithium concentration, 1 gram-atom per liter) are maintained at 25° C. for a period of 100 hours, the yield of polyvinylphenyldimethylsilane being 80%.

Intrinsic viscosity (in toluene at 25° C.) 1.2 dl./g.

EXAMPLE 8

Polymerization of styrene

Polymerization is carried out by following the procedure described in Example 6.

50 g. (0.5 mole) of styrene, 100 ml. of diethyl ether and 100 ml. of cyclohexane in the presence of 2 ml. of a cyclohexane solution of dilithium oligovinylbenzyldimethylsilane (lithium concentration, 1 gram-atom per liter) as initiator are maintained at −20° C. for a period of 4 hours.

The yield of polystyrene equals 95%.

Intrinsic viscosity (in benzene at 25° C.), 0.8 dl./g.

EXAMPLE 9

Divinyl-styrene copolymerization

In a 0.5-l. reaction vessel fitted with a stirrer are charged, in a stream of argon, 65 ml. of divinyl, 33 ml. of styrene, 400 ml. of toluene, and 1.5 ml. of the dilithium oligovinylbenzyldimethylsilane prepared as disclosed in Example 3.

Copolymerization is carried out for a period of 8 hours at 60° C., the yield of the copolymer being 86%.

Intrinsic viscosity (in benzene at 25° C.), 1.35 dl./g.

What we claim is:

1. A process for polymerizing monomers selected from the group consisting of conjugated dienes having 4 to 6 carbon atoms, styrene, methyl methacrylate, vinyltriorganosilanes wherein at least two of the three organo groups are methyl radicals, and mixtures thereof, which comprises contacting said monomers in the bulk or in organic solvent and at a temperature of from −50° to +150° C. with dilithium organosilane catalysts, the catalyst-to-monomer molar ratio being within the range of from 1:15 to 1:10,000, said catalyst consisting of dilithium organosilane oligomers represented by the general formula

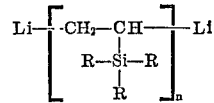

wherein R denotes the same or different $C_1$–$C_{10}$ alkyl radicals, aralkyl radicals or aryl radicals, and $n$ is an integer from 2 to 30.

2. A process as claimed in claim 1 wherein polymerization is carried out in a hydrocarbon solvent medium selected from the group consisting of paraffinic, aromatic and cycloaliphatic hydrocarbons and mixtures thereof.

3. A process as claimed in claim 1, wherein the catalyst-to-monomer molar ratio is in the range of from 1:500 to 1:10,000.

4. A process as claimed in claim 1, wherein polymerization is conducted in vacuo under a residual pressure of down to $10^{-5}$ mm. Hg.

5. A process as claimed in claim 1, wherein polymerization is carried out in the atmosphere of a gas that is chemically inert towards organolithium compounds.

6. The process as in claim 1, in which the catalyst is dilithium oligovinyltrimethylsilane.

7. The process as in claim 1, in which the catalyst is dilithium oligovinylphenyldimethylsilane.

8. The process as is claim 1, in which the catalyst is dilithium oligovinylbenzyldimethylsilane.

9. The process as in claim 1, wherein $n$ is an integer from 2 to 10.

10. The process as in claim 1, wherein said vinyltriorganosilane is selected from the group consisting of vinyltrimethylsilane, vinylphenyldimethylsilane, vinylethyldimethylsilane and vinylbutyldimethylsilane.

References Cited

UNITED STATES PATENTS 2,811,541   10/1957   Curry  ----- 260—80
3,324,089   6/1967   Trepka  ----- 260—80

JAMES A. SEIDLECK, Primary Examiner

U.S. Cl. X.R.

260—82.1, 83.5, 83.7, 89.5 A, 93.5 S, 94.2 M, 448.2 R